United States Patent Office 2,820,528
Patented Jan. 21, 1958

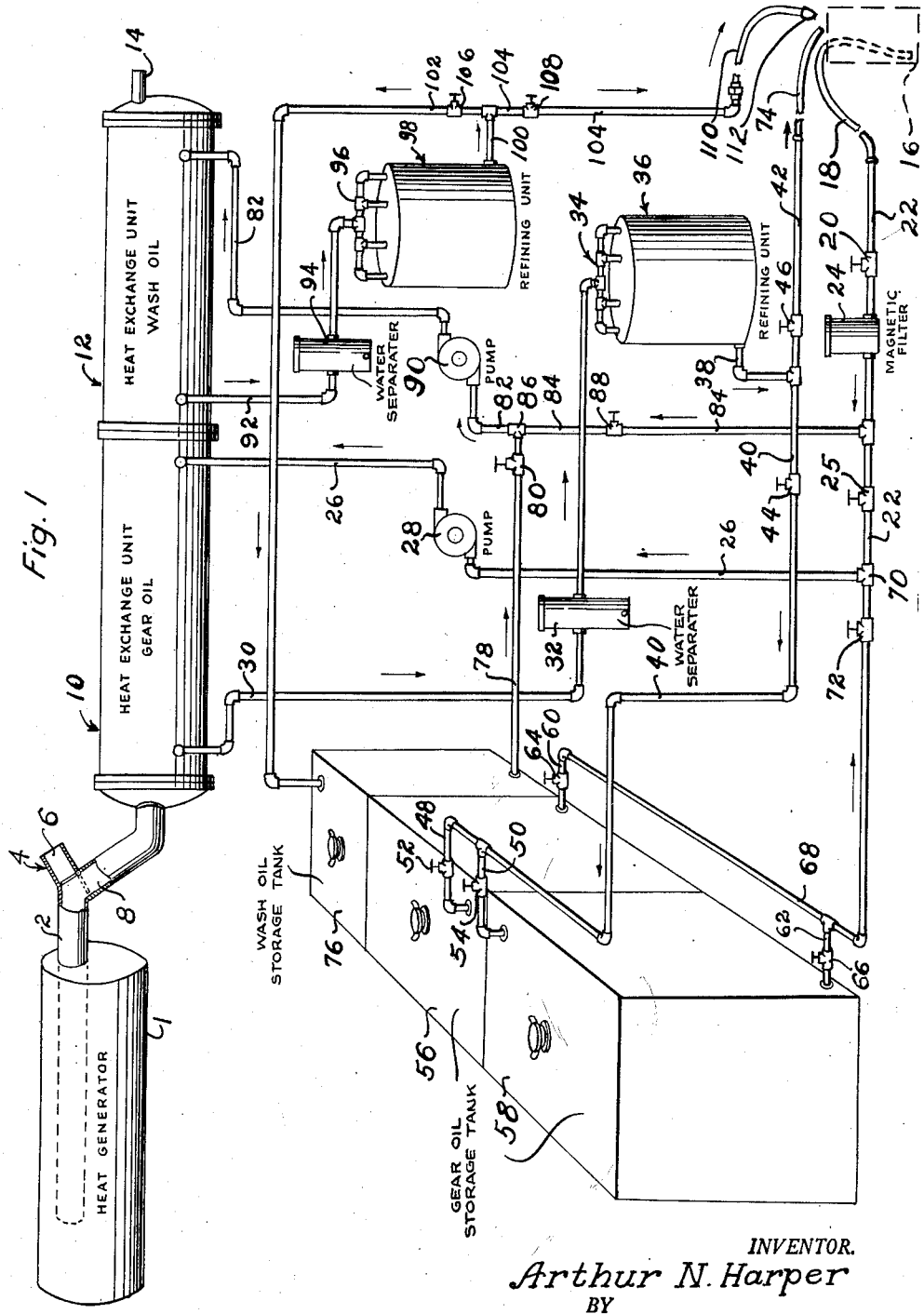

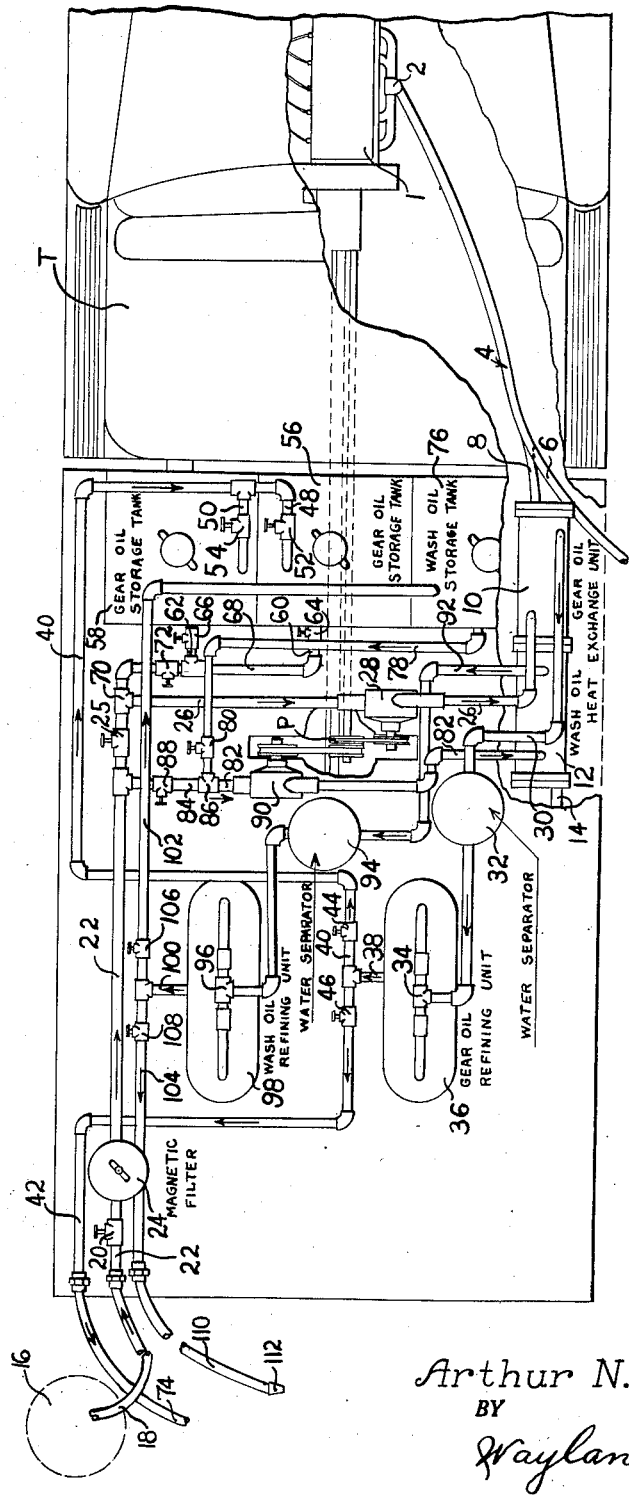

2,820,528

APPARATUS FOR CLEANING GEAR CASES AND REFINING THE OIL CONTAINED THEREIN

Arthur N. Harper, Wichita Falls, Tex.

Application May 26, 1954, Serial No. 432,384

2 Claims. (Cl. 184—1.5)

This invention relates to improvements in apparatus for cleaning gear cases and the oil contained therein, and provides for inspection of the condition of the gear case and the oil contained therein.

The present device is so constructed as to withdraw and clean any lubricant or oil in a gear case or lubricant chamber, on the job, and while the withdrawn oil is being cleaned, to direct heated wash oil into the gear case to clean the interior thereof and the gears contained therein.

Filters have been provided heretofore, but these, for the most part, were inadequate, as they did not provide for the removal of the sludge and settlings from the gear case or lubricant chamber.

An object of this invention is to provide an apparatus whereby oil within a gear case or lubricant chamber can be refined and at the same time clean the container thereof, such as a gear case or lubricant chamber, on the job, which apparatus is simple in construction, small enough to be readily transported, is easy to use and inexpensive to operate.

With this object in mind and others that will manifest themselves as the description proceeds, reference is to be had to the accompanying drawing, in which:

Fig. 1 is a perspective diagrammatic view of the arrangement of the various oil treating and storage elements and showing connected thereto conduits and valves for controlling same; and Fig. 2 is a fragmentary top plan view of a truck having an internal combustion engine, with parts broken away to show the details of construction and showing the oil treating apparatus mounted on the truck body.

With more detailed reference to the drawing, the numeral 1 designates generally a heat generating unit, such as an internal combustion engine powered by gasoline, butane or other type fuel burning equipment, which has an exhaust pipe 2 leading therefrom to discharge the products of combustion, such as the exhaust pipe of an internal combustion engine. A Y-branch connection 4 is provided, the branch 6 thereof discharges to the atmosphere and the branch 8 thereof discharges through a heat exchanger, designated generally at 10 and 12.

The heat exchange units may be of the flue type and connected together in end to end relation so that the longitudinally disposed flues are in register, one with the other, so that the products of combustion from the heat generator 1 will pass through aligned flues and out through discharge pipe 14.

In order to remove gear grease from a gear housing, indicated at 16, a suction hose 18 is provided, which, when used on a portable device, such as a truck, may be spooled on a suitable spool. The length of this hose 18 may often be in excess of fifty feet, so as to enable the hose to be inserted into a gear case at a point remote from the apparatus for cleaning the gear case and the oil contained therein, which apparatus is usually mounted on a truck T or the like, as the device is designed primarily to clean gear cases and the like in oil fields, such as those used on pump units, power drive units, and the like.

A valve 20 is positioned in the conduit line 22 adjacent hose 18, to which conduit the hose 18 is connected so as to prevent back drainage of oil out of the filter 24 and the conduit system after the oil has been removed from the gear case or the like 16, should the pumps of the system become stopped.

The magnetic filter 24, which is positioned within conduit 22, removes magnetic responsive particles from the oil, such as particles of gear teeth, bearings and the like, as the oil passes therethrough. A valve 25 is provided intermediate the magnetic filter 24 and a branch conduit 26, which conduit leads from conduit 22 to a pump 28, which is driven by a power drive means P. The pump 28 initially withdraws the oil from the gear case 16 by suction and forces it into the heat exchange unit 10, so that it surrounds the longitudinal flue elements which pass through the heat exchange unit. The oil is forced out of the heat exchange unit into conduit 30 and through water separator 32, which removes the water therefrom and directs the water-free oil, which oil is also free of magnetic responsive particles, into a manifold 34 which leads into the refining unit 36. The refining unit contains a suitable filter and chemical treatment for purifying and neutralizing the oil being refined of excessive, unwanted chemical content, and which refining process also removes gum and wax from the oil being treated.

The present apparatus is designed primarily to be mounted on a truck or trailer, therefore the various units must, of necessity, be comparatively small. A conduit 38 is provided, which leads from refining unit 36 and connects with conduits 40 and 42. The conduit 44 being provided with a valve 44 for closing same, and the conduit 42 is closable by a valve 46 provided therein. With the valve 46 closed and the valve 44 open, the oil passes through the refining unit 36 and is directed into branch conduits 48 and 50. The conduit 48 has a valve 52 therein and the conduit 50 has a valve 54 therein. The branch conduits 48 and 50 lead to storage tanks 56 and 58 respectively, so as the oil is processed through the refining unit 36, it is directed into a selected tank. Branch outlet pipes 60 and 62 are provided, one of which pipes are connected to a side of each of said tanks 56 and 58 a spaced distance above the bottom of the respective tanks and have the respective valves 64 and 66 therein to control the outlet of the oil therefrom. The branch conduits 60 and 62 connect with a conduit 68 that connects with conduit 22 at a T-connection 70. A valve 72 is provided in conduit 68 to control the discharge of oil from tanks 56 and 58.

A second hose 74 is attached to conduit 42 and is utilized to discharge the refined gear oil into gear case 16, in a manner that will be more fully described hereinafter. The hose 74 may be of a length in excess of fifty feet and may be spooled in a manner similar to that described for the hose 18.

After the gear oil has been removed from the gear case, it is desirable to wash the sludge and residue from the gears and from the interior of the gear case or housing 16 by means of a heated wash oil to which detergent may be added, as desired, so as to clean the case and the gears therein before returning the cleaned and refined gear oil thereinto.

A storage tank 76 is provided for wash oil, which wash oil is withdrawn therefrom through conduit 78 through valve 80 into conduit 82, which conduit 82 also connects to a conduit 84 by means of a T-member 86. The conduit 84 has a valve 88 therein which, during the withdrawal of oil from the storage tank 76, will be closed so that the oil withdrawn by pump 90, which pump is also driven by power drive means P, from tank 76 will be discharged into conduit 82 and into the heat exchange unit 12, as indicated by the arrows. The wash oil will circulate around the longitudinal flues within the heat exchange unit and be discharged out through conduit 92 through water separator 94 and into manifold 96, which leads to a refining unit 98 for the wash oil. An outlet conduit 100 leads from refining unit 98 and connects with conduits 102 and 104 having valves 106 and 108, respectively, therein. The conduit 102 is a return conduit to the top of tank 76, and the conduit 104 leads through valve 108 to a hose 110 that is, preferably, of a length similar to hose 18 and hose 74. However, the hose 110 is a discharge hose and is preferably provided with a nozzle 112 thereon so as to give a high velocity cleaning action to the wash oil that is discharged against the inside of the gear case, and gears therein.

*Operation*

The present apparatus is designed to fit onto a vehicle such as a truck or trailer, preferably a truck, thereby enabling the use of the exhaust gases therefrom for generating the heat necessary to properly refine the gear oil which is being treated. The oil is preferably heated to about 180° F.

In order to process and refine the oil, and to clean the gear case of sediment and of impurities, the cover of the gear case 16 is removed, and the inlet end of the suction hose 18 is inserted thereinto to approximately the lowest point of the oil sump thereof, and with the valves 20 and 25 open, and the valve 88 closed, the pump 28 is started, which will withdraw the contaminated oil from the gear case 16 through hose 18, conduit 22, magnetic filter 24, which magnetic filter will remove magnetic responsive metal pieces from the oil, into conduit 26 and discharge the oil under pump pressure, out through conduit 26 into the rear end of the heat exchange unit 10, whereupon the oil will flow forward around the heating flues in heat exchange unit 10 and be discharged into conduit 30 and through the water separator 32 which will remove any residual water therefrom. The oil then is directed, under pump pressure from water separator 32 through conduit 30 into manifold 34, having a multiplicity of branches leading into a refining unit 36. The pump pressure within the refining unit 36 will force the oil out through conduit 38 into conduit 40 and with valve 46 closed and valve 44 open, the oil will be forced through conduit 40 into branch conduit 48 or 50 and with the selected valve 52 or 54 open and with the other valve closed, the oil will be directed either into tank 56 or tank 58 and with the valve 72 closed all of the gear oil from the gear case 16 may be directed into one or both the tanks 56—58, as desired, and with the gear case emptied of all oil that can be removed by suction hose 18, valve 25 is closed and valve 72 opened, and with the valve 64 or 66 that connects with the particular tank or tanks in which the gear oil is stored, opened, the gear oil is directed from the tank or tanks 56—58 outward through conduit 60 or 62 into conduit 68 through open valve 72 and through conduit 26 and recirculated the number of times necessary to remove all impurities, sludge, wax and chemical adulterations contained therein, through the refining unit 36. By re-circulating the gear oil in this manner, through the refining unit a number of times, a portion of the impurities may be removed each time the oil is circulated through, therefore a much smaller refining unit may be used, than a refining unit which is sufficiently large to clean the oil on one passage therethrough, which unit may be mounted on a truck or trailer.

While the oil from the gear case 16 is being recirculated as indicated by the arrows, in the last mentioned cycle, a sufficient number of times to completely recondition the oil, the valve 88 is closed and the valve 80 is opened so that wash oil is withdrawn from the bottom of tank 76 and directed through conduit 78 through valve 80, conduit 82 and through pump 90 and discharged through conduit 82 into the rear end of heat exchange unit 12, whereupon, the oil circulates through heat exchange unit 12 in heat exchange relation with flues or tubes through which the hot gases from the heat generating unit 1 pass, and the hot oil is discharged out of the heat exchange unit 12 through conduit 92, through water separator 94 into manifold 96 and through refining unit 98 and outward through conduit 100 and with valve 106 closed and valve 108 open, the hot wash oil is directed outward through conduit 104 into hose 110 and out through nozzle 112 to wash the interior of the gear case 16 and the mechanism contained therein. As the wash oil accumulates in the lower portion of the gear case 16, and with the valve 20 open and the valve 25 closed, valve 88 open and valve 80 closed, the wash oil is withdrawn through conduit 22, magnetic filter 24, conduit 84 into pump 90, the wash oil will be directed upward through conduit 82 through heat exchange unit 12 and out through conduit 92, water separator 94 into manifold 96 of refining unit 98, and with valve 106 closed and valve 108 open, the clean, hot wash oil is directed out conduit 104, hose 110, high velocity nozzle 112 into gear case 16 over the desired period of time, while maintaining the desired amount of oil within the gear case, until the gear case 16 is thoroughly cleaned. Then with valve 108 closed and valve 106 open, the wash oil is withdrawn from gear case 16 through hose 18, conduit 22, magnetic filter 24, and through conduit 84 and pump 90 will be directed through the heat exchange unit 12 and thence out through conduit 92, water separator 94, manifold 96 into refining unit 98. Whereupon the cleansed wash oil will be directed out through conduits 100, open valve 106 into conduit 102 into storage tank 76, where the wash oil may be stored for future use.

It is to be pointed out that this washing action on the gear case may be repeated several times, and each time the wash oil will be run through the refining unit and back into the tank 76 for reuse. With the magnetic filter taking out the magnetically responsive particles of metal, and with the water separator removing any residual water contained therein. The refining unit 98 is similar in construction to the refining unit 36, and these units are so designed as to filter the oil to remove objectional sludge and wax therefrom, and to remove or neutralize any unwanted chemicals that may be present in the oil.

With valves 88 and 108 closed and with valves 80 and 106 open, the wash oil may be recirculated the desired number of times in order to thoroughly cleanse, filter and refine it in the manner set out above, whereupon, it is properly reconditioned after each successive washing operation, therefore the wash oil may be used repeatedly.

Upon completion of the washing action, the suction hose 18 is removed from the gear case 16 and with the valves 20, 25, and 44 closed and with the valves 62 or 64, 72 and 46 open and with the pump 28 operating to withdraw oil outward through conduit 60 and/or 62 into conduit 68 and through open valve 72 into conduit 26, as indicated by the arrows, the pump 27 will discharge oil through conduit 26 into the rear end of heat exchange unit 10 and out through conduit 30, water separator 32 into manifold 34 and into refining unit 36, thence out through conduit 38, open valve 46 into conduit 42 to be discharged through hose 74 into gear case 16.

It will be seen that, as the oil is removed from the gear case, it is brought into the magnetic filter 24, water separator 32 and refining unit 36 before it is discharged into either of the tanks 56 or 58, and after it has been recirculated the desired number of times through the various elements, as recited above, it is again discharged into the storage tanks, as desired. Therefore the gear oil cannot be removed and replaced into the gear case until it has made at least two complete cycles through the refining elements, however, by recirculating the oil in the manner disclosed above, the oil may be cleaned until it is of a quality equal to or superior to the quality of the original oil. With the oil reconditioned in this manner, and with the gear case cleaned by the wash oil process, the gear oil and the interior of the gear case are maintained at all times free of contamination and of objectional foreign matter.

Having thus described the invention, what is claimed is:

1. In an apparatus for cleaning gear cases and the like and for refining contaminated oil therein, a motor vehicle having an internal combustion engine therein, an exhaust pipe connected to and leading from said internal combustion engine, a heat exchange unit, said exhaust pipe being connected to said heat exchange unit, said heat exchange unit having passages formed therein for passage of exhaust gases longitudinally therethrough, a second heat exchange unit having passages formed therein for passage of exhaust gases therethrough connected in end to end relation with said first named heat exchange unit so exhaust gases will pass through said second heat exchange unit, said second heat exchange unit having an outlet port formed therein to exhaust the exhaust gases from said internal combustion engine, one of said heat exchange units being adapted to pass gear oil therethrough and the other of said heat exchange units being adapted to pass wash oil therethrough, a suction line adapted to be placed within said gear case for removing gear oil therefrom, a magnetic filter positioned within said suction line, a valve within said suction line intermediate the inlet thereof and said magnetic filter, a pair of pumps mounted on said motor vehicle for pumping gear oil and wash oil respectively, power means for driving said pumps, branch inlet conduits connecting the respective inlet sides of said pumps with said suction line, a valve in each branch inlet conduit intermediate said suction line and the respective pumps, a pair of water separators for passing gear oil and wash oil respectively, therethrough, a pair of oil refining units for passing gear oil and wash oil therethrough, respectively, at least two oil storage tanks, one for storing gear oil and one for storing wash oil, a conduit leading from the discharge side of said gear oil pump and connected to said gear oil heat exchange unit for passing gear oil thereinto, a conduit leading from said gear oil heat exchange unit and connecting to said gear oil water separator for passing gear oil thereinto, a further conduit leading from said gear oil water separator and connected with said gear oil refining unit for passing gear oil thereinto, a conduit leading from said gear oil refining unit and connected to said gear oil storage tank for passing gear oil thereinto, a valve within said conduit leading from said refining unit to said gear oil storage tank, a conduit leading from said gear oil refining unit for discharging gear oil into said gear case or the like, a valve within said conduit leading from said gear oil refining unit to said gear case, a discharge conduit leading from said gear oil storage tank and connected with said branch inlet conduit leading to said suction line of said gear oil pump intermediate said valve in said branch inlet conduit and said gear oil pump, a valve within said discharge conduit leading from said gear oil storage tank, said gear oil pump being adapted to withdraw gear oil from said gear case through said suction line, through one of said branch inlet conduits and to discharge said oil through said gear oil heat exchange unit, through said gear oil water separator, through said gear oil refining unit and with said valve in said gear oil discharge line leading to said gear case closed, the gear oil will be discharged from said gear oil refining unit into said gear oil storage tank, and with the valve within said branch inlet pipe leading from said suction line to said inlet side of said gear oil pump closed, and with the valve in said gear oil discharge line leading from said gear oil storage tank open, gear oil will be circulated within the system for the purification thereof, said wash oil pump having the discharge side thereof connected to said wash oil heat exchange unit for directing wash oil thereinto, a conduit connected with the outlet side of said wash oil heat exchange unit for directing wash oil therefrom into said wash oil water separator, a conduit connected from the discharge side of said wash oil water separator to said wash oil refining unit for directing wash oil into said wash oil refining unit, an outlet conduit leading from said wash oil refining unit to said wash oil storage tank, a valve within said outlet conduit leading from said wash oil refining unit to said wash oil storage tank, a second outlet line leading from said wash oil refining unit, said second outlet line being connected to a hose for directing wash oil into said gear case, a valve within said second outlet line, a nozzle on the discharge end of said hose, a conduit leading from said wash oil storage tank and connected with said branch inlet pipe leading to said wash oil pump intermediate said valve in said branch inlet line and said wash oil pump, so said wash oil may be drawn outward from said wash oil storage tank by said wash oil pump, then directed, under pressure by said pump, through said gear case and through said system in a continuous cycle, with the wash oil being discharged back into the gear case at high velocity through said nozzle, and with the discharge valve in said second outlet of said wash oil refining unit closed and with the valve in said first mentioned outlet conduit open, all wash oil is withdrawn through said suction line and forced through said wash oil purification system and discharged into said wash oil storage tank, and with the valve closed within said line leading from said gear oil refining unit to said gear oil storage tank, and with the valve in said second line leading from said gear oil refining unit to said gear case open, oil is withdrawn from said gear oil storage tank by said gear oil pump and discharged through said purification system out through said second mentioned line leading from said gear oil refining unit to said gear case, whereby purified gear oil is discharged from said system into said gear case.

2. In a mobile apparatus for cleaning gear cases and the like, and for refining the contaminated oil therein, a vehicle, a heat generating unit mounted on said vehicle, a heat exchange unit, said heat exchange unit having passages formed therein for passage of heated gases longitudinally therethrough, a second heat exchange unit having passages formed therein for passage of heated gases therethrough connected in end to end relation with said first named heat exchange unit so said heated gases will pass through said second heat exchange unit, said second heat exchange unit having an outlet port formed therein to exhaust the heated gases therefrom, one of said heat exchange units being adapted to pass gear oil therethrough and the other of said heat exchange units being adapted to pass wash oil therethrough, a suction line adapted to be placed within said gear case for removing gear oil therefrom, a magnetic filter positioned within said suction line, a valve within said suction line intermediate the inlet thereof and said magnetic filter, a pair of pumps mounted on said vehicle for pumping gear oil and wash oil respectively, power means for driving said pumps, branch inlet conduits connecting the respective inlet sides of said pumps with said suction line, a valve in each branch inlet conduit intermediate said suction line and the respective pumps, a pair of water separators for passing gear oil and wash oil respectively, therethrough, a pair of oil refining units for passing gear oil and wash oil therethrough, respectively, at least two oil storage tanks, one for storing gear oil and one for storing wash oil, a conduit leading from the discharge side of said gear oil pump and connected to said gear oil heat exchange unit for passing gear oil thereinto, a conduit leading from said gear oil heat exchange unit and connecting to said gear oil water separator for passing gear oil thereinto, a further conduit leading from said gear oil water separator and connected with said gear oil refining unit for passing gear oil thereinto, a conduit leading from said gear oil refining unit and connected to said gear oil storage tank for passing gear oil thereinto, a valve within said conduit leading from said refining unit to said gear oil storage tank, a conduit leading from said gear oil refining unit for discharging gear oil into said gear case or the like, a valve within said conduit leading from said gear oil refining unit to said gear case, a discharge conduit leading from said gear oil storage tank and connected with said branch inlet conduit leading to said suction line of said gear oil pump intermediate said valve in said branch inlet conduit and said gear oil pump, a valve within said discharge conduit leading from said gear oil storage tank, said gear oil pump being adapted to withdraw gear oil from said gear case through said suction line, through one of said branch inlet conduits and to discharge said oil through said gear oil heat exchange unit, through said gear oil water separator, through said gear oil refining unit and with said valve in said gear oil discharge line leading to said gear case closed, the gear oil will be discharged from said gear oil refining unit into said gear oil storage tank, and with the valve within said branch inlet pipe leading from said suction line to said inlet side of said gear oil pump closed, and with the valve in said gear oil discharge line leading from said gear oil storage tank open, gear oil will be circulated within the system for the purification thereof, said wash oil pump having the discharge side thereof connected to said wash oil heat exchange unit for directing wash oil thereinto, a conduit connected with the outlet side of said wash oil heat exchange unit for directing wash oil therefrom into said wash oil water separator, a conduit connected from the discharge side of said wash oil water separator to said wash oil refining unit for directing wash oil into said wash oil refining unit, an outlet conduit leading from said wash oil refining unit to said wash oil storage tank, a valve within said outlet conduit leading from said wash oil refining unit to said wash oil storage tank, a second outlet line leading from said wash oil refining unit, said second outlet line being connected to a hose for directing wash oil into said gear case, a valve within said second outlet line, a nozzle on the discharge end of said hose, a conduit leading from said wash oil storage tank and connected with said branch inlet pipe leading to said wash oil pump intermediate said valve in said branch inlet line and said wash oil pump, so said wash oil may be drawn outward from said wash oil storage tank by said wash oil pump, then directed, under pressure by said pump, through said gear case and through said system in a continuous cycle, with the wash oil being discharged back into the gear case at high velocity through said nozzle, and with the discharge valve in said second outlet of said wash oil refining unit closed and with the valve in said first mentioned outlet conduit open, all wash oil is withdrawn through said suction line and forced through said wash oil purification system and discharged into said wash oil storage tank, and with the valve closed within said line leading from said gear oil refining unit to said gear oil storage tank, and with the valve in said second line leading from said gear oil refining unit to said gear case open, oil is withdrawn from said gear oil storage tank by said gear oil pump and discharged through said purification system out through said second mentioned line leading from said gear oil refining unit to said gear case, whereby purified gear oil is discharged from said system into said gear case.

References Cited in the file of this patent

UNITED STATES PATENTS

| | | |
|---|---|---|
| 1,074,730 | Morris | Oct. 7, 1913 |
| 1,337,408 | Morris | Apr. 20, 1920 |
| 1,659,136 | Cutting | Feb. 14, 1928 |
| 2,425,848 | Vawter | Aug. 19, 1947 |
| 2,479,139 | Seigel | Aug. 16, 1949 |
| 2,685,347 | Busby | Aug. 3, 1954 |

FOREIGN PATENTS

| | | |
|---|---|---|
| 119,110 | Great Britain | Sept. 26, 1918 |
| 589,882 | Great Britain | July 2, 1947 |